Figure 2:
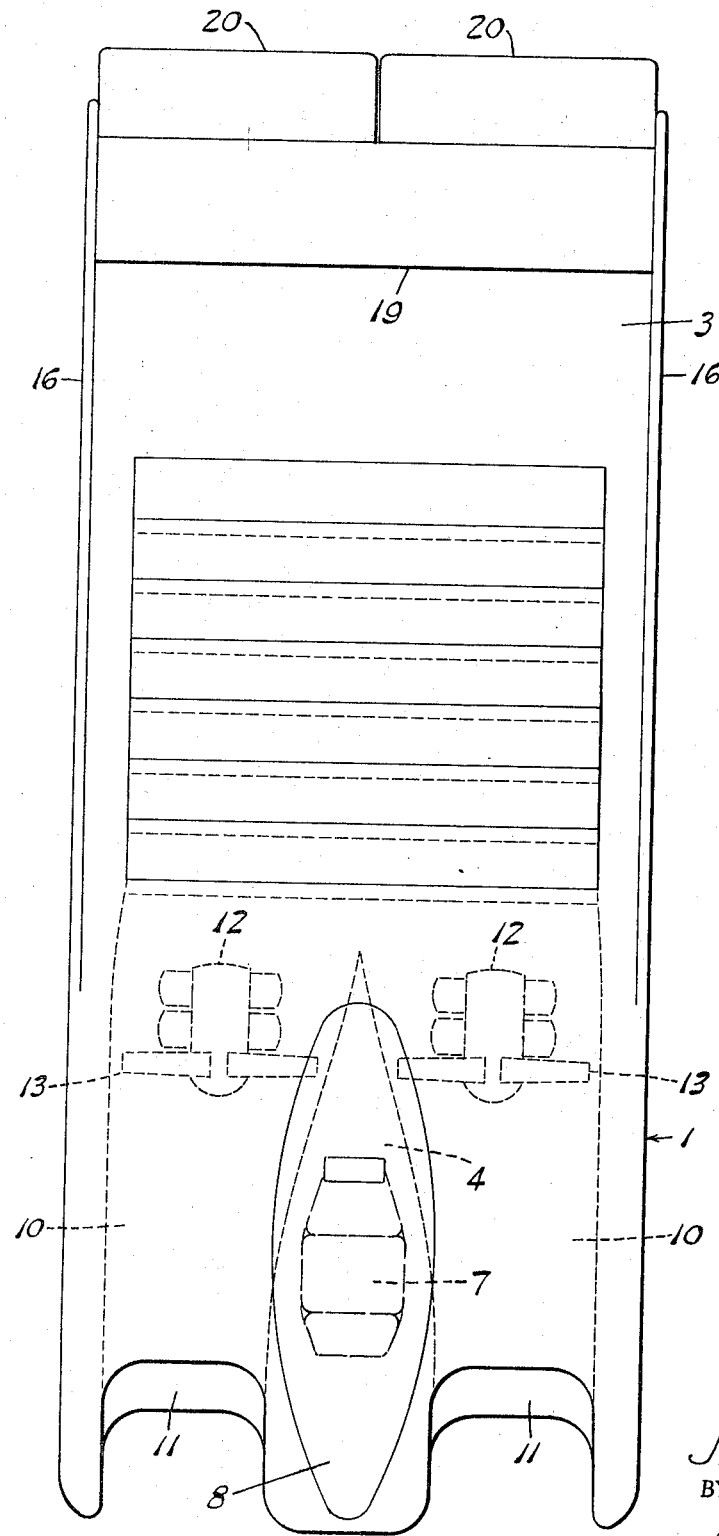

May 2, 1967  J. G. SAWYER  3,317,161
AIR CAR
Filed Oct. 29, 1964  3 Sheets-Sheet 1
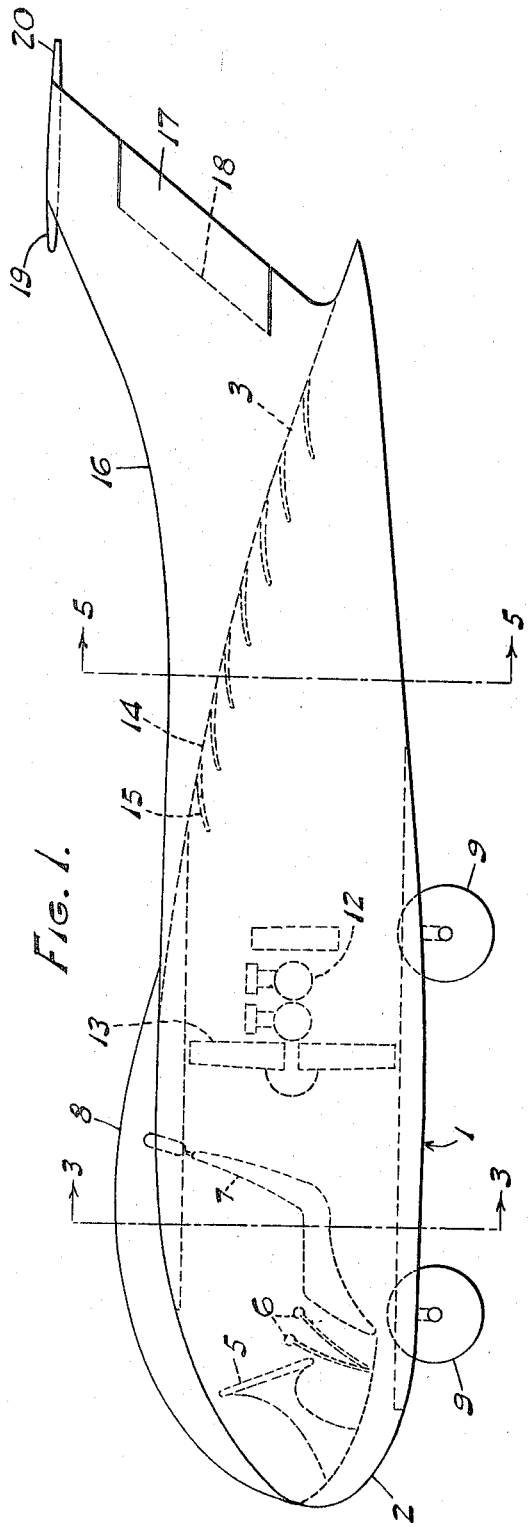
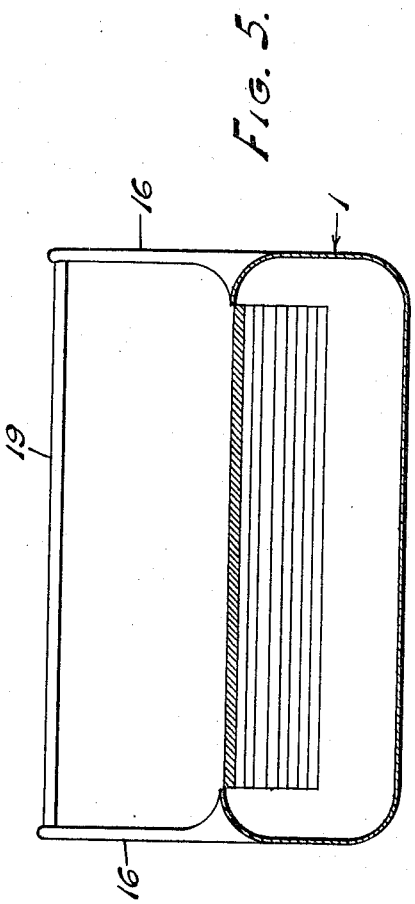
INVENTOR.
JAMES G. SAWYER
BY
Christel & Bean
ATTORNEYS May 2, 1967  J. G. SAWYER  3,317,161
AIR CAR Filed Oct. 29, 1964  3 Sheets-Sheet 3

INVENTOR.
JAMES G. SAWYER
BY
Christel & Bean
ATTORNEYS

United States Patent Office 3,317,161
Patented May 2, 1967

3,317,161
AIR CAR
James G. Sawyer, Snyder, N.Y., assignor to General Turbine Corp., Buffalo, N.Y.
Filed Oct. 29, 1964, Ser. No. 407,319
7 Claims. (Cl. 244—36)

This invention relates generally to the vehicular art, and more specifically to a new and useful surface vehicle capable of flight which I sometimes refer to as an air car.

In designing a surface vehicle to be capable of flight, a primary problem is to provide for the necessary lift. Laterally projecting airplane type wings obviously would provide lift, but they also would get in the way on an automobile and would therefore be objectionable. The high aspect ratio of conventional aircraft simply is not suited to highway and street driving, and parking. Further, legal limits on vehicle widths often would preclude effective laterally wing structures. Heretofore, combined ground-air vehicles customarily have relied upon conversion contrivances such as foldable or removable wings, removable propellers and the like, often comprising a relatively conventional aircraft which is structurally altered for surface travel. However, such contrivances are inconvenient, and any necessity for structural conversion or alteration of external configuration is undesirable.

More recently, vehicles have been designed which generate a downwardly directed blast of air with sufficient thrust to lift the vehicle. However, they are not efficient, nor are they suited for general use.

Other constructions have been proposed, without substantial success, being impractical for various reasons.

So far as I am aware, no ground-air vehicle has heretofore been proposed which is free of lifting wing structures attached to the vehicle body and otherwise truly suitable as a road vehicle, and which is also capable of efficient flight without requiring structural conversion, although the desirability of such a vehicle is obvious.

Accordingly, a primary object of my invention is to provide a surface vehicle free of laterally projecting wings and having the general proportions and maneuverability of a conventional automobile, enabling it to be driven along roadways and through traffic, and parked in an ordinary manner, which vehicle is capable of efficient flight without altering its external configuration and without requiring external structural conversion.

Another object of my invention is to provide the foregoing in a simple, relatively inexpensive construction which is extremely practical and suitable for the intended purpose.

In one aspect thereof, a surface vehicle constructed in accordance with my invention is characterized by its freedom from laterally projecting wing structures and by its capability of flight without changing its external configuration, having a body of aerodynamic air foil shape in side elevation with a low aspect ratio, an air passageway through the vehicle body including forwardly directed air inlet means in the forward portion of the body and rearwardly directed air discharge means in the upper rear portion of the body, and means carried by the body and arranged to force air through the passageway and out the discharge means, the discharge means being arranged to direct the exiting air essentially parallel to the upper rear body portion for boundary layer control, with stabilizer means and surface engaging support means being carried by the body.

Figure 3:
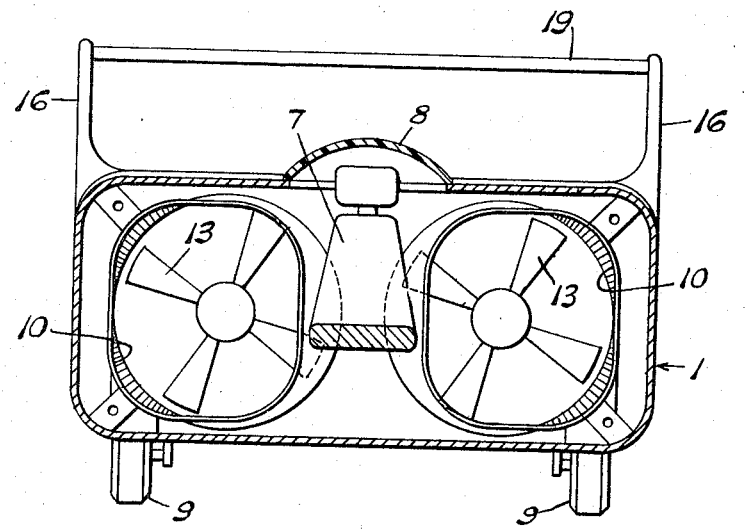
Figure 4:
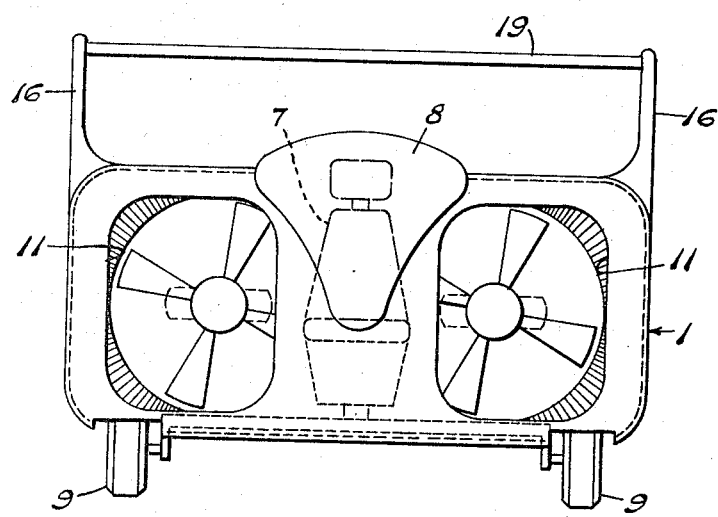

The foregoing and other objects, advantages and characterizing features of my invention will become clearly apparent from the ensuing detailed description of an illustrative embodiment thereof, reference being made to the accompanying drawings depicting the same wherein like reference numerals denote like parts throughout the various views and wherein:

FIG. 1 is a side elevational view of an illustrative air car of my invention;
FIG. 2 is a top plan view thereof;
FIG. 3 is a transverse sectional view thereof, taken about on line 3—3 of FIG. 1;
FIG. 4 is a front elevational view thereof; and
FIG. 5 is a transverse sectional view thereof taken about on line 5—5 of FIG. 1.

Referring now in detail to the illustrative embodiment of my invention depicted in the accompanying drawing, the same comprises an automotive vehicle having a body 1 of generally oblong end view form, being generally flat-sided and elongated from front to rear, providing a box-like appearance not unlike that of many conventional automobiles. It is a particular feature of my invention that, although the illustrated vehicle is capable of efficient flight, it is entirely free of laterally projecting wings.

To accomplish this, I provide body 1 with the shape of an airfoil in side elevation, having a rounded forward end 2, and an upper surface of greater curvature than the bottom surface, the upper rear portion 3 being inclined downwardly to the gently upwardly curving bottom surface. The length of body 1 is several times the width thereof, thereby providing an airfoil of low aspect ratio, for example on the order of ½ to 1, as contrasted with the high aspect ratio on the order of 5 or 10 to 1 usually provided on conventional aircraft. Thus, body 1 has the proportions of a conventional automobile, but the shape of an airfoil to provide lift. The low aspect ratio of body 1 preserves its automotive proportions.

Body 1 is provided with a passenger and control compartment 4 in its forward end, containing for example an instrument gauge panel 5, various controls 6 and a seat 7, which latter can be supported on the vehicle undercarriage. The top and front of compartment 4 are enclosed by a bulging canopy 8 of Plexiglas or other suitable transparent material, to provide vision forwardly, laterally and rearwardly, as well as upwardly, and can be either enclosed internally of body 1 or left open, as shown, to comprise a partially open area in body 1.

Front and rear pairs of ground engaging wheels 9 are mounted on suitable axles carried by body 1. Steering and drive mechanisms connect the various wheels with a steering control and with an engine for maneuverability in the manner of an automobile. Since these parts can be conventional, the details thereof are not shown. Of course, a three wheel arrangement also can be provided.

The airfoil shape of body 1 will provide the lift necessary for flight. It is a further feature of my invention that body 1 is capable of efficient flight, without conversion contrivences and without altering its external configuration. This is accomplished as follows.

An air passageway is provided through body 1, comprising internal ducting including a pair of air inlet ducts 10 opening forwardly through the forward end 2 of body 1 on opposite sides of compartment 4 and having forwardly directed, ram air inlets 11 as clearly illustrated in FIG. 2. Internal combustion engines 12 or other suitable motor means are carried by body 1, being mounted in ducts 10 adjacent the inner ends thereof where they join, and being cooled by air passing through the ducting. Motors 12 drive fans 13 which also are positioned in the inlet ducts 10. Fans 13 draw air through inlets 11, into and through the internal ducting, forcing the air outwardly through rearwardly directed discharge orifices 14 which open through the upper rear portion 3 of body 1.

Discharge orifices 14 comprise a series of parallel, elongated outlet openings extending substantially the full width of body 1 and provided with guide vanes 15 coextensive therewith. Vanes 15 extend into the air passageway in body 1 and are curved forwardly and downwardly, the discharge arrangement being such that the exiting air is directed rearwardly and downwardly, essentially parallel to surface 3.

This propulsion air discharge arrangement is extremely important, because it substantially eliminates the boundary layer of relatively stagnant air which tends to form along the upper, rear surface of an airfoil, and because it stabilizes the air flow over the airfoil against the disturbing effect of the airfoil tip portions comprising the opposite side portions of body 1. Such stagnant air has a very detrimental aerodynamic effect, because it causes the main airstream over the airfoil to separate therefrom, thereby destroying the lift of the airfoil. This condition is aggravated at the tips of the airfoil where high pressure air from beneath flows around the tip to the upper airfoil surface, seeking the low pressure area. Such cross flow of air disrupts the desired, lift-producing flow of air from the leading to the trailing edge of the airfoil. Stagnant air also causes extreme turbulence, producing drag, instability and a host of prohibitive conditions.

This phenomena and the problems created thereby are critical in a low aspect ratio aircraft, because such an airfoil aerodynamically is essentially only a pair of closely adjacent wing tips. The airfoil tip portions, which extend the length of the relatively narrow body, therefore dominate the airfoil and the airflow thereover. Since the tip portion of an airfoil disrupts the airflow, a low aspect ratio airfoil is essentially unflyable.

It is a particular feature of my invention that such stagnant air is substantially eliminated by the air exiting from orifices 14, and that the exiting air stream has sufficient power to blast through and dominate the disrupting wing tip effect. This is accomplished by utilizing the entire propulsion air stream for this purpose. The discharge orifices 14 thereby provide a boundary layer control and an airflow stabilizing effect greatly improving the lift of airfoil body 1 and providing for efficient flight operation.

The rearward direction of orifices 14 also provides a jet effect. This, and the ram effect produced by the forwardly directed inlets 10, 11, further increases the efficiency of operation.

Vertical stabilizer tail fins 16 are provided on opposite sides of body 1, comprising an initially generally tangential, rearwardly extending continuation of the forward upper surface of body 1. Tail fins 16 have rudders 17 pivotally connected thereto for movement about generally upright axes indicated at 18. At their upper ends, tail fin members 16 support a horizontal stabilizer 19 which extends therebetween. Vertical stabilizers 16 support horizontal stabilizer 19 in spaced relation above body 1, thereby avoiding interference with air passing over the body. A pair of ailerons 20 are pivotally connected to stabilizer 19 in side-by-side relation, for movement about normally horizontal axes.

In the illustrated embodiment, stabilizers 16 comprise dorsal fins extending the full length of the body portion 3 and along the entire series of discharge orifices 14. They thereby provide a barrier between the relatively low pressure air passing over the body portion 3 and the air on opposite sides of the body. This reduces mixing of high and low pressure air across the upper rear of body 1, thereby to maintain the lift and efficiency provided by body 1 and the internal air passage and discharge arrangement 10-15.

For driving over the ground, the vehicle is operated in the manner of an ordinary automobile. Some or all of wheels 9 are driven by a suitable motor, which can be motors 12, and appropriate wheels 9 are provided with a steering mechanism which can be operated by a control 6. Fans 13 are at rest, being declutched from motors 12 which can instead be clutched to drive wheels 9.

The vehicle has the general shape, proportions and dimensions of a conventional automotive vehicle. Horizontal stabilizer 19 is not a lift wing, and therefore is of relatively small size as compared with airfoil body 1 whereby the tail assembly will not dominate the vehicle from an appearance point of view. The vehicle will be regarded, not as an oddity, but more as a particularly streamlined automobile.

The vehicle can be driven, parked, garaged and maneuvered in the manner of an ordinary automobile. Canopy 8 can be hinged for swinging out of the way to provide access to and from compartment 4, or separate access doors can be provided.

When it is desired to become airborne, no structural conversions or changes in external configuration are required. The operator simply manipulates the appropriate controls, as indicated at 6, causing fans 13 to be driven by motors 12. Fans 13 force air through inlet ducts 10 and out discharge orifices 14, causing the vehicle to move forwardly, lift and become airborne as soon as the necessary speed has been reached. Fans 13 and motors 12 have sufficient power to provide the propulsion necessary for the take-off, and for sustained flight. Airfoil body 1 will fly, and because discharge orifices 14, 15 maintain the powerful stream of exiting propulsion air essentially parallel to the airfoil surface, boundary layer control is established and stability against the disturbing wing tip effects is provided, causing the airfoil body to fly efficiently. The separation of high and low pressure air by dorsal fins 16 assists in maintaining this efficiency, and the ram inlet and jet exhaust increase it.

The vehicle is maneuvered, when airborne, through manipulation of rudders 17 and ailerons 20 by appropriate controls as indicated at 6. These controls and control connections in and of themselves can be conventional aircraft control connections, and therefore are not illustrated.

Thus, it is seen that my invention fully accomplishes its intended objects. The lift area of a conventional light aircraft is provided, but in a low aspect ratio configuration having the general proportions of a conventional automobile. The vehicle has the maneuverability of an automobile, yet is capable of flight without conversion contrivences and without altering its external configuration. Propulsion is accomplished through an internal ducting arrangement stabilizing the airflow over the low aspect ratio airfoil against the disturbing wing tip effects. While I have disclosed and described in detail only one embodiment of my invention, that has been done by way of illustration only, without thought of limitation. For simplicity and greater clarity in understanding, I have illustrated primarily only that which is essential to my invention while omitting those details such as steering, rudder and aileron control mechanisms, and drive connections, which in and of themselves can be conventional and as such are well known to those skilled in the art.

Having fully disclosed and completely described my invention, and its mode of operation, what I claim as new is:

1. A surface vehicle free of laterally projecting wing structures and capable of air travel without changing its external configuration comprising a body of aerodynamic airfoil shape in side elevation having a low aspect ratio, an air passageway through said body including forwardly directed air inlet means in the forward portion of said body and rearwardly directed air discharge means in the upper rear portion of said body, said upper rear portion of said body providing a rearwardly and downwardly inclined airfoil lift surface, said discharge means directing the exiting air downwardly along and essentially parallel to the airfoil surface of said upper rear body portion for boundary layer control, said upper rear lift surface extending rearwardly and downwardly to a trailing edge with the bottom surface of said body, means carried by said body arranged to force air through said passageway and out of said discharge means, stabilizer means carried by said body, and surface engaging support means carried by said body.

2. A vehicle capable of both surface and air travel without external structural conversion comprising a body of aerodynamic airfoil shape in side elevation having a low aspect ratio, surface engaging means carried by said body, an air passageway through said body including forwardly directed air inlet means in the forward portion of said body and rearwardly directed air discharge means in the upper rear portion of said body, said upper rear portion of said body providing a rearwardly and downwardly inclined airfoil lift surface, an engine carried by said body, a fan driven by said engine and positioned to force air through said passageway and out said discharge means, said discharge means directing the exciting air downwardly along and essentially parallel to the airfoil surface of said upper rear portion of said body for boundary layer control thereat, said upper rear lift surface extending rearwardly and downwardly to a trailing edge with the bottom surface of said body, and stabilizer means carried by said body.

3. A surface vehicle capable of air travel essentially without altering its external configuration comprising a body of aerodynamic airfoil shape in side elevation having a low aspect ratio, an air passageway through said body including forwardly directed air inlet means opening through the forward portion of said body and rearwardly directed air discharge means opening through the upper rear portion of said body, said upper rear portion of said body providing a rearwardly and downwardly inclined airfoil lift surface, a motor in said body, a fan in said passageway driven by said motor to force air through said passageway and out said discharge means, said discharge means directing the exiting air downwardly along and essentially parallel to the airfoil surface of said upper rear body portion for boundary layer control therealong, said upper rear lift surface extending rearwardly and downwardly to a trailing edge with the bottom surface of said body, stabilizer means carried by said body, and surface engaging support means carried by said body.

4. A vehicle capable of both surface and air travel without external structural conversion comprising a body of aerodynamic airfoil shape in side elevation having a low aspect ratio, dorsal fin means on opposite sides of the upper rear portion of said body, an air passageway through said body including forwardly directed air inlet means in the forward portion of said body and rearwardly directed air discharge means in said upper rear portion of said body between said dorsal fins, said upper rear portion of said body providing a rearwardly and downwardly inclined airfoil lift surface, an engine in said body, fan means driven by said engine and positioned in said passageway to force air therethrough and out said discharge means, said discharge means directing air exiting therethrough downwardly along the airfoil contour of said upper rear portion of said body for boundary layer control, said upper rear lift surface extending rearwardly and downwardly to a trailing edge with the bottom surface of said body, said dorsal fins separating high pressure air on opposite sides of said body from low pressure air over said upper rear portion of said body, horizontal stabilizer means carried by said dorsal fin means, said lift surface extending completely across said upper rear body portion between said fins, and surface engaging support means carried by said body.

5. A surface vehicle free of laterally projecting wing structures and capable of air travel without external structural conversion and without altering its external configuration comprising a lengthwise elongated body of aerodynamic airfoil shape in side elevation having a low aspect ratio, dorsal fins on opposite sides of the upper rear portion of said body, an air passageway through said body including a forwardly directed ram air inlet in the forward portion of said body and a plurality of laterally elongated rearwardly directed air discharge orifices through said upper rear portion of said body in generally, parallel relation therealong between said dorsal fins, said upper rear portion of said body providing a rearwardly and downwardly inclined airfoil lift surface, a motor in said body, a fan in said body driven by said motor to force air through said passageway and out said discharge orifices, said discharge orifices directing the air exiting therethrough downwardly along and essentially parallel to the airfoil contour of said upper rear body portion for boundary layer control, said upper rear lift surface extending rearwardly and downwardly to a trailing edge with the bottom surface of said body, said dorsal fins separating high pressure air on opposite sides of said body from low pressure air over said upper rear portion of said body, said lift surface extending completely across said upper rear body portion between said fins, horizontal stabilizer means carried by said dorsal fins in spaced relation above said body, and surface engaging support means carried by said body.

6. A vehicle capable of both surface and air travel without external structural conversion comprising a body of aerodynamic airfoil shape in side elevation having a low aspect ratio, said body having a rearwardly and downwardly inclined upper rear portion providing a lift surface, said body being free of external lift wing structures, an air passageway through said body including forwardly directed air inlet means and rearwardly directed air outlet means directing the exiting air downwardly along and essentially parallel to said upper rear airfoil surface portion of said body for stabilizing air flow thereover, said upper rear lift surface extending rearwardly and downwardly to a trailing edge with the bottom surface of said body, propulsion means for forcing air through said passageway and out said outlet means, stabilizer means carried by said body, and surface engaging support means carried by said body.

7. An automotive vehicle capable of flight comprising a body of aerodynamic airfoil shape in side elevation having a low aspect ratio, said body having a rearwardly and downwardly inclined upper rear portion providing a lift surface, said vehicle being free of lift surfaces other than said body, an air passageway through said body including forwardly directed air inlet means and air outlet means directing the exiting air downwardly along and essentially parallel to said upper rear airfoil lift surface portion of said body for boundary layer control, said upper rear lift surface extending rearwardly and downwardly to a trailing edge with the bottom surface of said body, means to force air through said passageway and out said outlet means, stabilizer means carried by said body, and ground surface engaging support means carried by said body.

References Cited by the Examiner
UNITED STATES PATENTS

| | | | |
|---|---|---|---|
| 2,619,302 | 11/1952 | Loedding | 244—36 X |
| 2,713,465 | 7/1955 | Novinger | 244—2 |
| 2,923,494 | 2/1960 | Strong | 244—2 |
| 3,026,066 | 3/1962 | Coates | 244—36 X |

MILTON BUCHLER, Primary Examiner.

FERGUS S. MIDDLETON, Examiner.

T. MAJOR, Assistant Examiner.